(12) United States Patent
Berg et al.

(10) Patent No.: US 6,558,535 B2
(45) Date of Patent: *May 6, 2003

(54) RESIDENTIAL SEPTIC TANK WITH SEAMS ABOVE SEWAGE LINE AND RESIDENTIAL SEPTIC TANK WITH STEPPED RIBS

(75) Inventors: Robin Berg, Hudson, WI (US); Kaushik Mallick, West Savage, MN (US); Brian Garcia, St. Paul, MN (US); Michael Zais, Lakeville, MN (US)

(73) Assignee: Xerxes Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,852

(22) Filed: Mar. 23, 2001

(65) Prior Publication Data

US 2001/0019026 A1 Sep. 6, 2001

Related U.S. Application Data

(63) Continuation of application No. 09/517,266, filed on Mar. 2, 2000, now Pat. No. 6,280,614.

(51) Int. Cl.$^7$ ............................................... B01D 21/00
(52) U.S. Cl. ...................... 210/170; 210/232; 210/532.2
(58) Field of Search ............................... 210/170, 232, 210/532.1, 532.2; 220/567.1

(56) References Cited

U.S. PATENT DOCUMENTS

| | | | |
|---|---|---|---|
| 2,764,545 A | * | 9/1956 | Primich |
| 3,097,166 A | * | 7/1963 | Monson |
| 3,412,891 A | * | 11/1968 | Bastone et al. |
| 3,426,903 A | * | 2/1969 | Olecko |
| 3,655,468 A | * | 4/1972 | Bastone et al. |

(List continued on next page.)

FOREIGN PATENT DOCUMENTS

| | | |
|---|---|---|
| FR | 2050858 | 4/1971 |
| JP | 07 290074 | 11/1995 |

OTHER PUBLICATIONS

Terry R. Bounds, "Alternative Sewer Designs, Effluent Sewer Technology, Septic Tank Effluent Pump (STEP) and Septic Tank Effluent Gravity (STEG) Systems", Orenco Systems, Inc. 1996, pp.1–30.

(List continued on next page.)

Primary Examiner—Fred Prince
(74) Attorney, Agent, or Firm—Piper Rudnick, LLP; Steven B. Kelber

(57) ABSTRACT

A water-tight fiberglass septic tank is strong enough to withstand live loads. The fiberglass septic tank is preferably designed with integral ribs to for structural strength. In one preferred embodiment, the tank is made in two unequal halves. The lower half comprises the major portion of the tank and includes a bottom, two endwalls and two sidewalls. The upper half comprises a cover. This arrangement allows the horizontal seam to be placed above the internal waterline, thereby protecting the seam from exposure to sewage. At least one of the endwalls includes a raised top portion that allows a pipe to be located near the top of the lower portion without passing through the seam between the upper and lower portions of the tank. The endwalls are also curved to allow for angled inlet and outlet pipe connections. The ribs are preferably internal and hollow. The lower portion of the tank is also preferably flat bottomed. A provision has been made for a self-locating baffle if required. In another preferred embodiment, a cylindrical male molded tank is created on a mandrel. The tank circumference is stepped, which both provides for built-in stepped ribs and eases removal of the tank from the mandrel. In preferred embodiments of the tank, a baffle is located at the position of a stepped rib so that the stepped rib supports the baffle.

16 Claims, 12 Drawing Sheets

U.S. PATENT DOCUMENTS 3,662,918 A * 5/1972 Crawford et al.
3,741,393 A * 6/1973 Estes et al.
3,767,051 A * 10/1973 Thompson
3,826,376 A * 7/1974 Carlson et al.
3,904,524 A * 9/1975 Pelton et al.
4,325,823 A * 4/1982 Graham
4,363,732 A * 12/1982 Crates et al.
4,689,145 A * 8/1987 Mathews et al.
4,933,076 A * 6/1990 Oshima et al.
5,320,247 A * 6/1994 Sharp
5,361,930 A * 11/1994 Perry
6,227,396 B1 * 5/2001 Small
6,280,614 B1 8/2001 Berg et al.

OTHER PUBLICATIONS

T. R. Bounds, "Design and Performance of Septic Tanks" Orenco Systems, Inc., date unknown.

Roger Machmeier,"Get to Know Your Septic Tank", www-.geocities.com/Rainforest...achmeier/Machmeier_Get_To_know.html, Reprinted courtesy of the author and Pumper Magazine, date unknown.

* cited by examiner

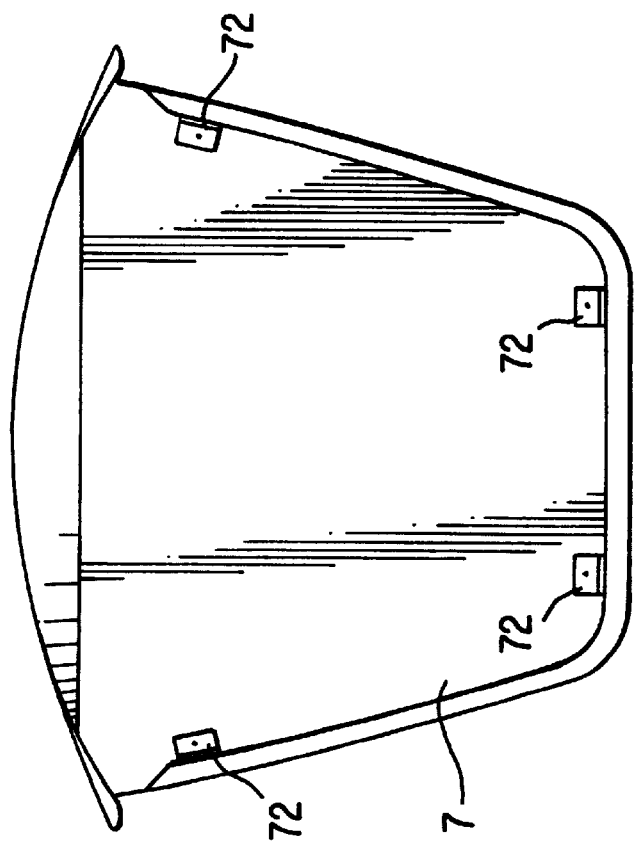
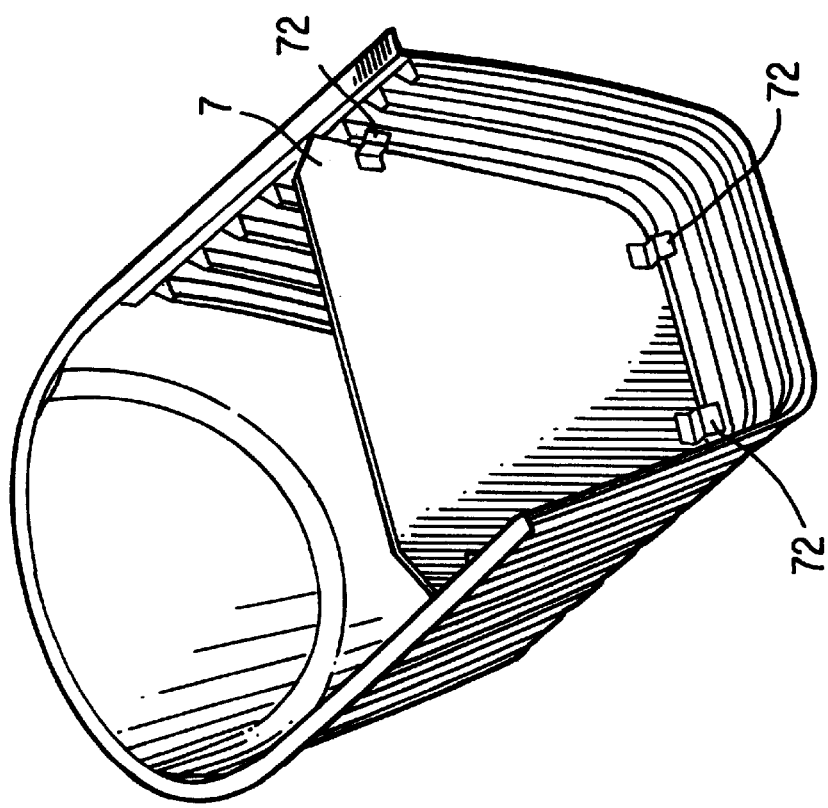
FIG. 11B
FIG. 11A

RESIDENTIAL SEPTIC TANK WITH SEAMS ABOVE SEWAGE LINE AND RESIDENTIAL SEPTIC TANK WITH STEPPED RIBS

This is a continuation of U.S. patent application Ser. No. 09/517,266 filed Mar. 2, 2000, now issued as U.S. Pat. No. 6,280,614.

BACKGROUND OF THE INVENTION

1. Field of the Invention

The invention relates to septic tanks generally, and more particularly to a water-tight septic tank.

2. Discussion of the Background

Tanks for the first phase treatment of home waste have traditionally been referred to as septic tanks. Septic tanks slow down and temporarily hold a waste flow from a home so that a natural cleansing action involving anaerobic bacteria can occur. As sewage enters the tank, solids separate from fluids and fall to the bottom. Anaerobic bacteria break the solids down to reduce the volume. However, the volume of the solids is never reduced to zero; therefore, a residue remains. It is this residue that must be removed from the septic tank.

An example of a typical septic tank system 100 is shown in FIG. 1. The system 100 includes a tank 110 with an inlet 120 and an outlet 130. The tank 100 also includes an access riser 140. As sewage enters the tank 110, it separates into one of three distinct layers in the tank. The top layer 170 is referred to as scum. This layer includes components of the sewage such as cooking oils and fats, cigarette filters, and other materials that float. Most of the scum does not decompose in the septic tank 110. The middle layer 160 is referred to as the clear layer. The scum layer 170 actually floats on the middle layer 160 such that approximately three quarters of the volume of the scum layer 170 is below the liquid level 161 of the middle layer 160 and approximately one quarter of the volume of the scum layer 170 is above the liquid level 161. The middle layer 160 comprises mostly liquids with suspended solids. Bacteria digest many of the suspended solids in this area. The bottom layer 150 is referred to as sludge. This layer contains most of the sewage solids and is generally oxygen free. Anaerobic bacteria reduce the volume of solids in this layer greatly, but not entirely.

In operation, raw sewage enters the inlet 120. The inlet 120 is typically shaped as a "T" or "Y" to prevent clogging of the inlet 120 by the scum layer 170. The raw sewage separates into the three layers 150, 160, 170 as discussed above, where the bacteria begin breaking the sewage down. As sewage enters the tank 110 through the inlet 120, a corresponding volume of sewage from the clear layer 160 exits the tank 110 through the outlet 130, which is also "T" or "Y" shaped for the same reason the inlet is shaped that way. As long as the fluid in the clear area 160 has been present in the tank for a sufficient amount of time for the bacteria to do their work, the fluid exiting the tank through the outlet 130 is relatively clear. The exiting fluid is typically released into the surrounding soil, where further biodegradation continues.

However, if the fluid in the clear layer 160 has not been in the tank 110 for a sufficient amount of time, solids are released with the fluid through the outlet 130 and into the surrounding soil, causing the surrounding soil to become clogged or blocked. At this point the system 100 has failed. One main cause of septic system 100 failure is the entry of ground water into the tank 110, which causes the premature release of fluid in the layer 160 from the tank 110. Therefore, it is important that the tank 110 be watertight.

The use of baffles has become popular in recent years. A baffle 190 is shown in phantom in FIG. 1. The baffle 190 is essentially a vertical wall that separates the tank 100 into two portions, usually such that the first portion (the portion nearest the inlet 120) is at least ⅔ of the volume of the tank. The baffle 190 usually includes a passage located in the clear layer 160. The idea is to allow clear fluids only past the baffle so that further biodegradation can occur before the fluids are expelled through the outlet 130. Because only fluids pass through the baffle 190, the size of the sludge and scum layers 150, 170 is theoretically greatly reduced relative to the clear layer 160 in the portion of the tank 110 downstream of the baffle 190. There is ongoing dispute within the industry as to the effectiveness of baffles.

Prior art tanks are often made of concrete or rotocast thermoplastic. The problem with concrete tanks is that historically they have been fabricated poorly. Also, concrete leaks unless it is professionally designed and manufactured and then carefully installed by a trained and experienced field installer. When those precautions are taken, the cost of the tank is increased and becomes non-competitive in many instances. A leaking septic tank interrupts the treatment process as described above. On the other hand, thermoplastic tanks are often watertight, but are not strong. Over time, they collapse under loads when being driven over by trucks or under other hydrostatic loads. Another weakness is that such rotocast thermoplastic tanks will often collapse when pumped dry during the periodic sludge removal process.

Another popular method for handling home sewage is to pipe the sewage from the home to a central treatment plant. This plant is usually built by a municipality. The waste that is pumped to the plant is not treated before it leaves the home and is therefore thicker because it includes solids. Transporting waste in this manner requires large pipes made of concrete. Such pipes are usually six inches or larger in diameter. In addition, getting the waste to the plant requires either expensive pumping stations or installing the pipes with the correct pitch for a gravity flow system, which can add significantly to the expense in installing the pipes at the requisite depths.

An additional problem is that the market is changing. Some municipalities are no longer accepting new subscribers. Developers are often now required to install their own treatment systems when they build development sites.

SUMMARY OF THE INVENTION

The invention solves the aforementioned problems to a great extent by providing a fiberglass septic tank that is watertight and strong enough to withstand live loads such as those resulting from vehicles being driven over the tanks, hydrostatic loads, and ground forces exerted on the tank when the tank is pumped dry. In preferred embodiments, the fiberglass septic tank is designed with integral ribs for structural strength.

In one preferred embodiment, the tank is made in two unequal halves. The lower half comprises the major portion of the tank and includes a bottom, two endwalls and two sidewalls. The upper half comprises a cover. This arrangement allows the horizontal seam to be placed above the internal waterline, thereby protecting the seam from exposure to sewage. Because of the size and light weight of the cover, it can be installed manually at the site without the use of power equipment, resulting in significant savings. At least one of the endwalls includes a raised top portion that allows the fluid inlet to be located near the top of the lower portion without passing through the seam between the upper and lower portions of the tank. The endwalls are also curved to allow for angled inlet and outlet pipe connections. The ribs are preferably internal, integral and hollow and the tank is preferably shaped such that multiple tanks may be stacked during shipment to reduce shipping costs. The internal ribs also provide support for an optional baffle. The lower portion of the tank is also preferably flat bottomed, which both eases installation (because the tank will stand upright on a bed of pea gravel) and increases the volume of the sludge storage area. The tank is preferably sized at approximately 500 to 3,000 gallons for residential use. In some preferred embodiments, the bottom internal ribs are filled with foam. The foam acts as a spacer or dunnage when tanks are stacked during shipping. The foam also fills the space under the ribs, thus eliminating the need for backfill in that area.

In another preferred embodiment, a cylindrical male molded tank is created on a mandrel. The tank circumference is stepped, which both provides for built-in stepped ribs and eases removal of the tank from the mandrel. In preferred embodiments of the tank, a baffle is located at the position of a stepped rib so that the stepped rib supports the baffle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 11a,b are perspective and end views, respectively, of a portion of a tank having a relocatable baffle according to a preferred embodiment of the present invention.

DETAILED DESCRIPTION OF THE PREFERRED EMBODIMENTS

Figure 2:
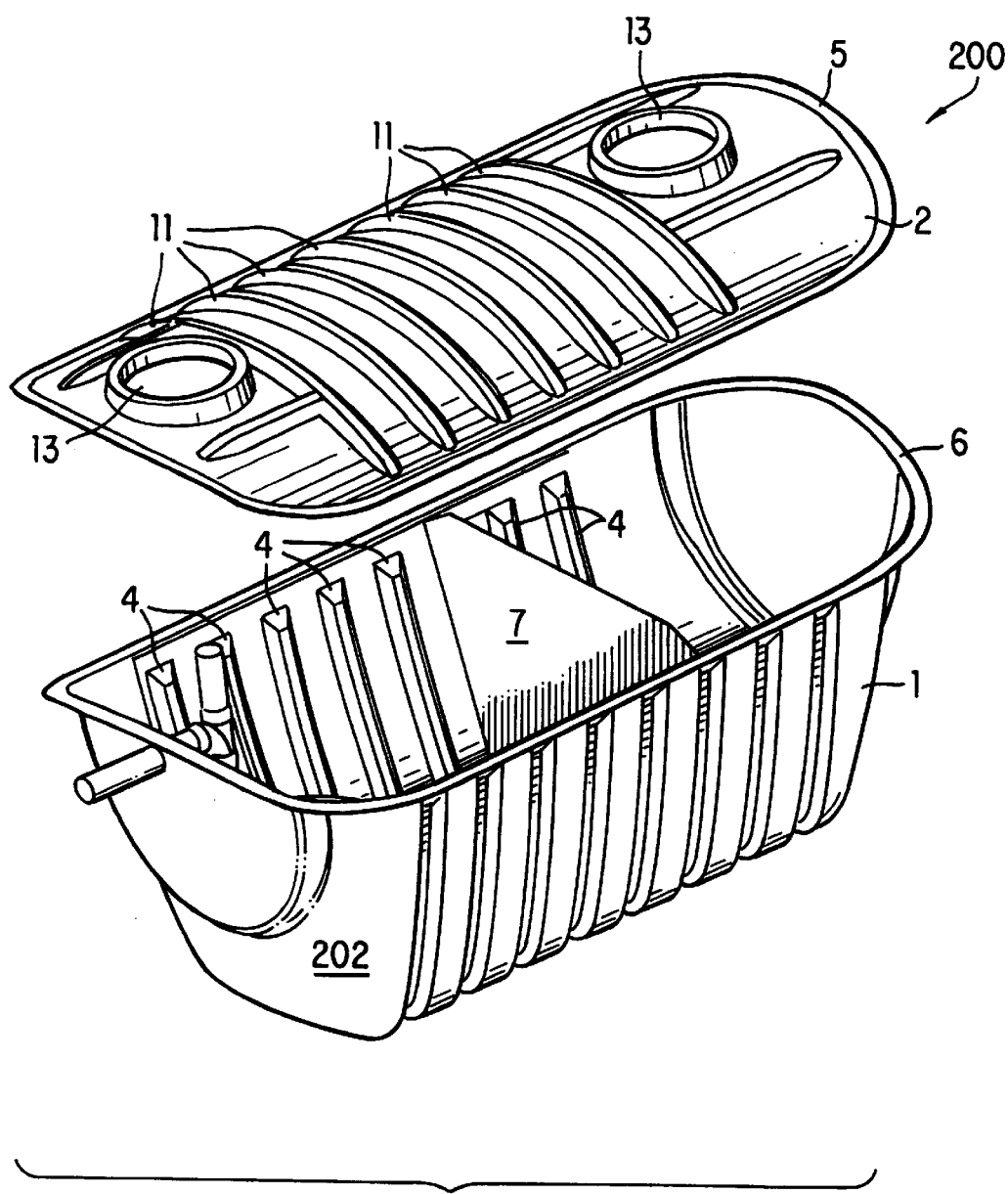
FIG. 2 is a perspective view of a septic tank according to a preferred embodiment of the invention.

Referring now to the drawings, wherein like reference numerals designate identical or corresponding parts throughout the several views, a perspective view of a septic tank 200 is shown in FIG. 2. The tank 200 is unequally divided into a lower portion 1 and an upper portion 2. The lower portion 1 includes a number of integral, spaced apart ribs 4. The ribs 4 are sized and spaced to provide structural support for the tank 200 so that it can absorb hydrostatic loads as well as loads exerted by vehicles such as pickup trucks driving over the tank 200. The tank 200 is also capable of withstanding ground forces exerted on the tank 200 when it is installed and later pumped dry.

Figure 3B:
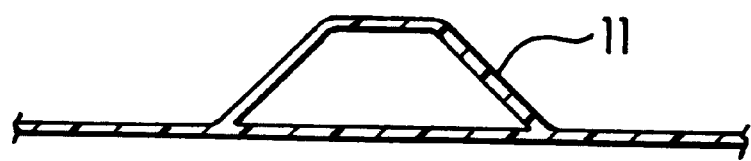
FIGS. 3a,b,c are side views of a sidewall rib, a filled bottom rib and a closed top rib, respectively, of the tank of FIG. 2.
Figure 3A:
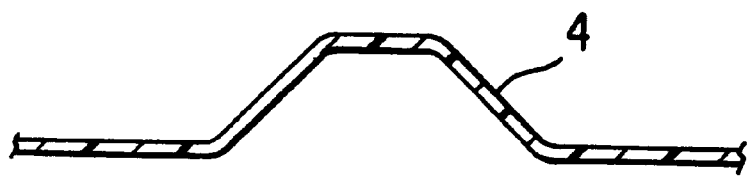

In preferred embodiments, the ribs 4 are hollow and internal. As shown in FIG. 3a, the ribs 4 are preferably trapezoidally shaped. Exemplary dimensions for the rib 4, when used with a tank 200 having a 1500 gallon capacity and one quarter inch thick fiberglass construction, are a base width of four inches, a top width of two inches, and a height of one and three quarters inches. As will be apparent to those of ordinary skill in the art, the dimensions of the walls and ribs, as well as the number of ribs, may be varied to meet the desired tank capacities as well as site-specific conditions (soil conditions, burial depths, expected traffic over the tank, government regulations, etc.).

Referring now back to FIG. 2, the lower portion 1 is preferably shaped such that it is stackable, especially when provided with internal hollow ribs 4. The tanks 200 may be stacked, for example, 10 tanks high with as many as 4 stacks on a flatbed truck. This is a great improvement over cement tanks, which are not stackable and therefore could only be shipped four to a truck. Another advantage associated with using internal ribs 4 is that one rib 4 provides support for an optional baffle 7 installed in the tank 200. The baffle 7 may be attached to the desired rib 4 by an adhesive 9. In an alternate embodiment shown in FIGS. 11a and b, the baffle 7 may be held in place by bolt-on (which may be installed in the field) or molded guide clips 72. Normally, the baffle 7 retains solids but is not required to be watertight. However, if a watertight baffle 7 is required, then an adhesive may be used between the baffle 7 and the internal rib 4 to create the required watertight seal.

Referring now back to FIG. 2, the upper portion 2 of the tank 200 includes two access risers 13. The access risers 13 allow access to the tank 200 when periodic sludge removal becomes necessary. Two access risers 13 are provided because the tank is divided by the baffle 7. If no baffle 7 is included, then only a single access riser 13 is necessary.

Figure 4A:
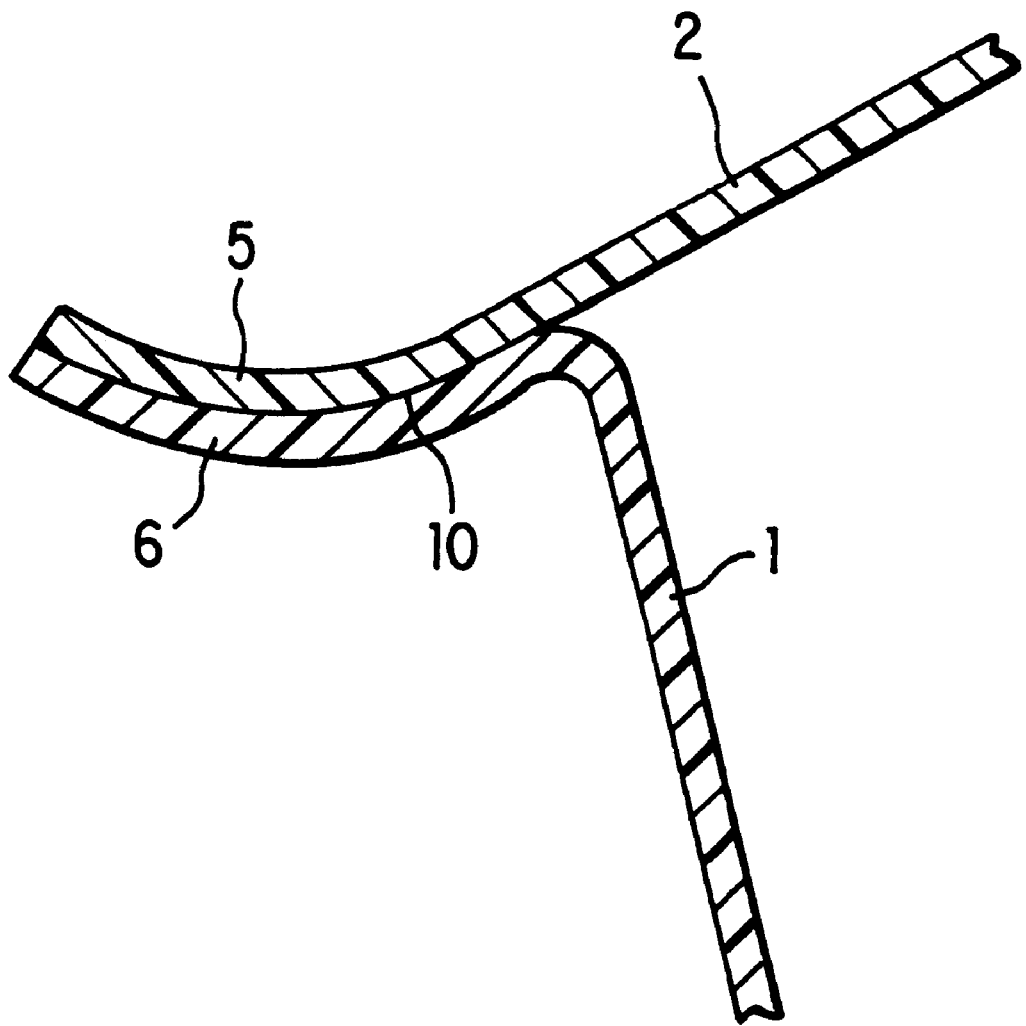
FIGS. 4a and 4b are cross sectional views of alternative forms of joints between the upper and lower portions of the tank of FIG. 2.

The lower portion 1 is provided with a flange 6. A corresponding flange 5 is provided on the upper portion 2. The flanges 5, 6 provide a large surface area for the formation of a chemical bond between the upper portion 2 and the lower portion 1 as shown in FIG. 4a. An adhesive or reinforced resin 10 is placed on one or both of the flanges 5, 6, which are then placed together (using pressure if necessary for the particular adhesive 10) to form the joint shown in FIG. 4a. The mating surfaces of the flanges 5, 6 must be properly cleaned and prepared (e.g., abraded) to ensure that a watertight bond is formed.

Figure 4B:
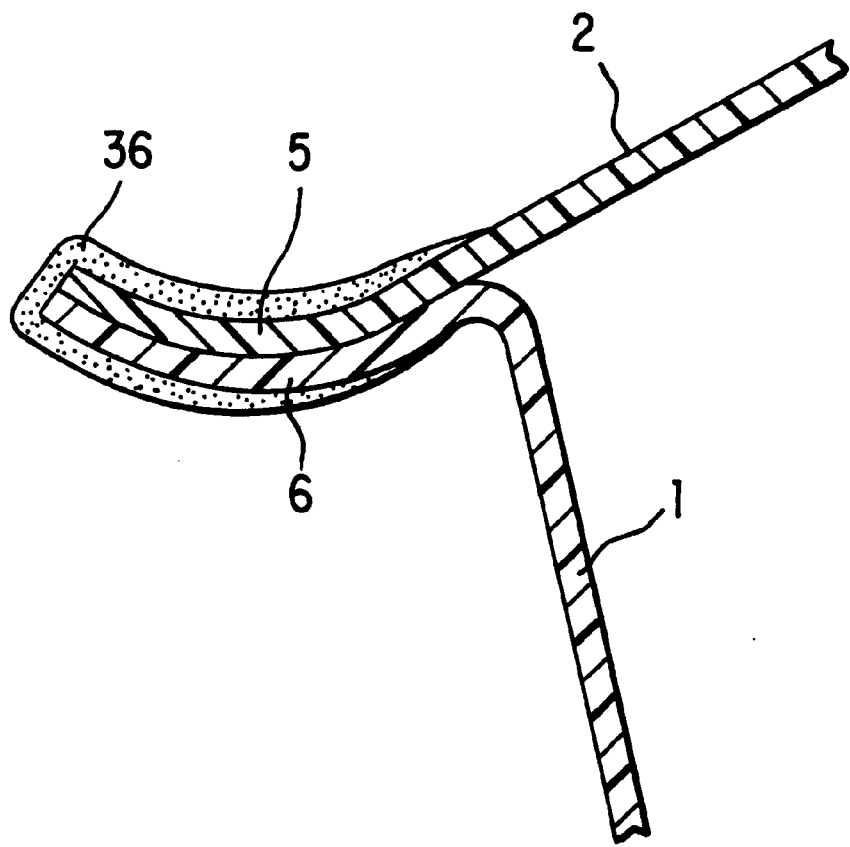

An alternative joint is illustrated in FIG. 4b. In this configuration, the adhesive 36 is applied to the outside surfaces of the upper and lower portions 2, 1, again to keep the adhesive isolated from the sewage in the tank 200 as much as possible.

Referring now back to FIG. 2, it can be seen that the upper portion 2 includes ribs 11. Unlike the ribs 4 in the lower section 1, the ribs 11 are external ribs. In preferred embodiments, the ribs 11 are hollow and trapezoidally shaped with dimensions similar to or the same as the ribs 4. The ribs 11 may be closed off as shown in FIG. 3b.

Figure 5:
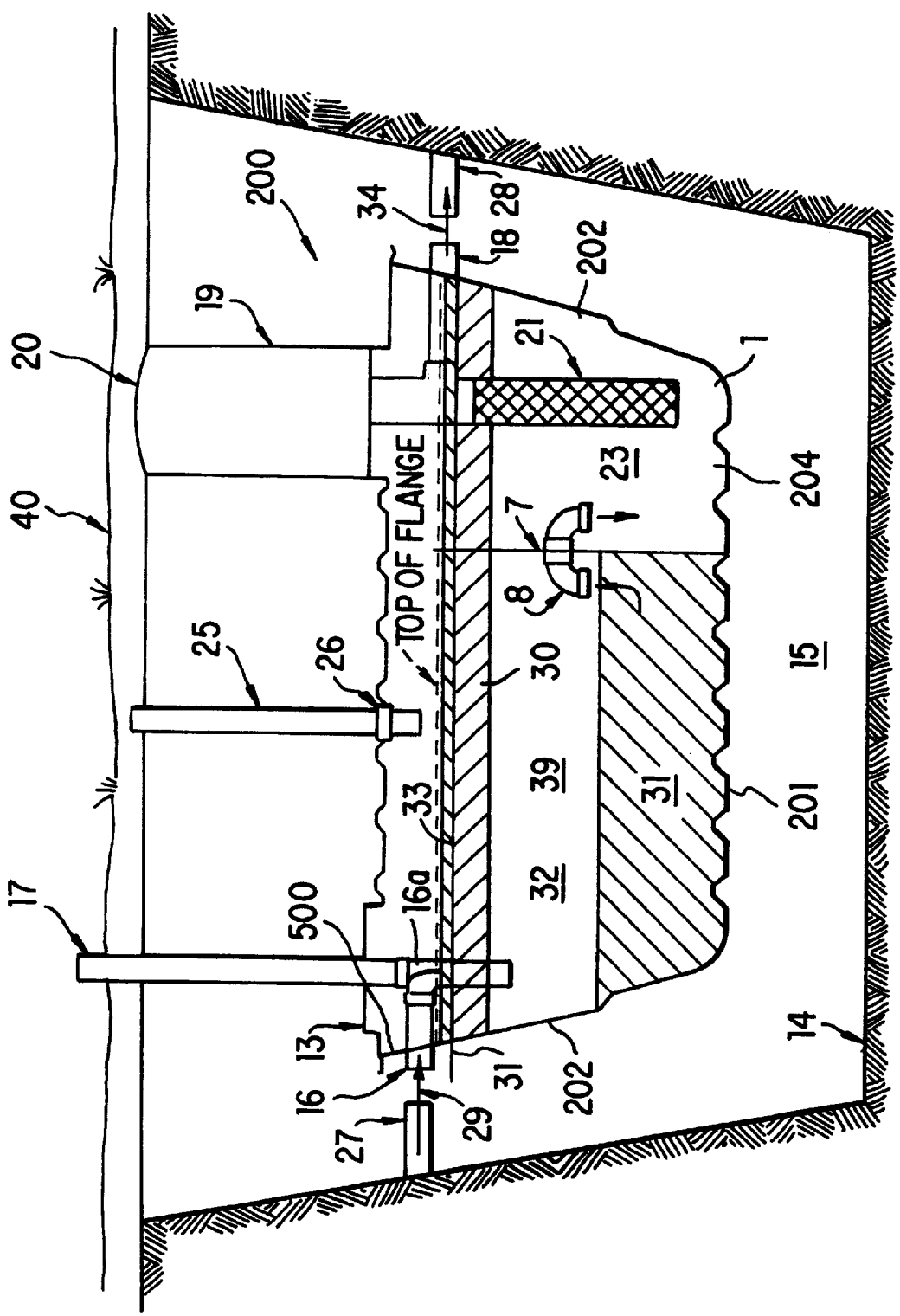
FIG. 5 is a side view of the septic tank of FIG. 2 installed in the ground.

FIG. 5 is a side view illustrating an installed tank 200. The tank 200 resides in a pit 15 formed in the surrounding soil 14. The pit 15 is typically backfilled with a self-compacting material such as pea gravel. The backfill is important because it must both support the tank and endure loads that are created when, for example, a pickup truck is driven over the tank 200 (as opposed to dumping excessive load on the tank 200 itself).

Figure 3C:
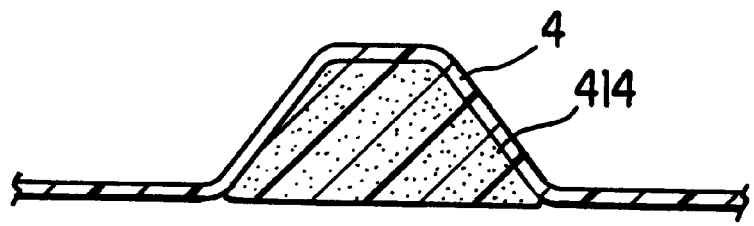

In practice, a level bed of pea gravel is formed in the pit 15 before the tank 200 is installed. If the pea gravel is well graded, clay and other materials will not flow into the backfill and create voids in the native soil which can later cause the soil to settle or collapse around the tank 200. Next, the tank 200 is set on the level bed of pea gravel. Because the bottom of the tank 200 is substantially flat, the tank 200 is level and stable. This feature of the tank 200 means that the tank 200 will not need to be shimmed to hold it straight and level while backfill is applied along the sides of the tank 200. The voids created on the bottom of the tank by the internal ribs 4 may be filled with foam 414 as shown in FIG. 3c, thereby eliminating concerns regarding backfill in these voids.

When the tank 200 is positioned correctly and the sides are backfilled, the tank inlet 16 can be connected to the sewage line 27 from the house and the tank outlet 18 can be connected to the discharge line 28, which may lead to a discharge field in the soil or to another processing facility as discussed further below.

The tank 200 includes a baffle 7, which preferably divides the tank 200 into a first compartment 39 that encompasses approximately ⅔ of the total volume of the tank 200 and a second compartment 23 that encompasses approximately ⅓ of the total volume of the tank 200. A pipe 8 in the shape of an inverted "U" is installed in the baffle to prevent buoyancy-neutral solids (e.g. condoms) from clogging the passage in the baffle 7. Also provided in the tank 200 is a filter 21, which screens any solids that may enter the smaller compartment 23 from exiting the tank into the drain field through the outlet 18. The filter 21 preferably comprises a wire mesh. If site conditions do not permit a gravity flow system, a pump (not shown in FIG. 5) may be connected between the filter 21 and the outlet 18.

Figure 1:
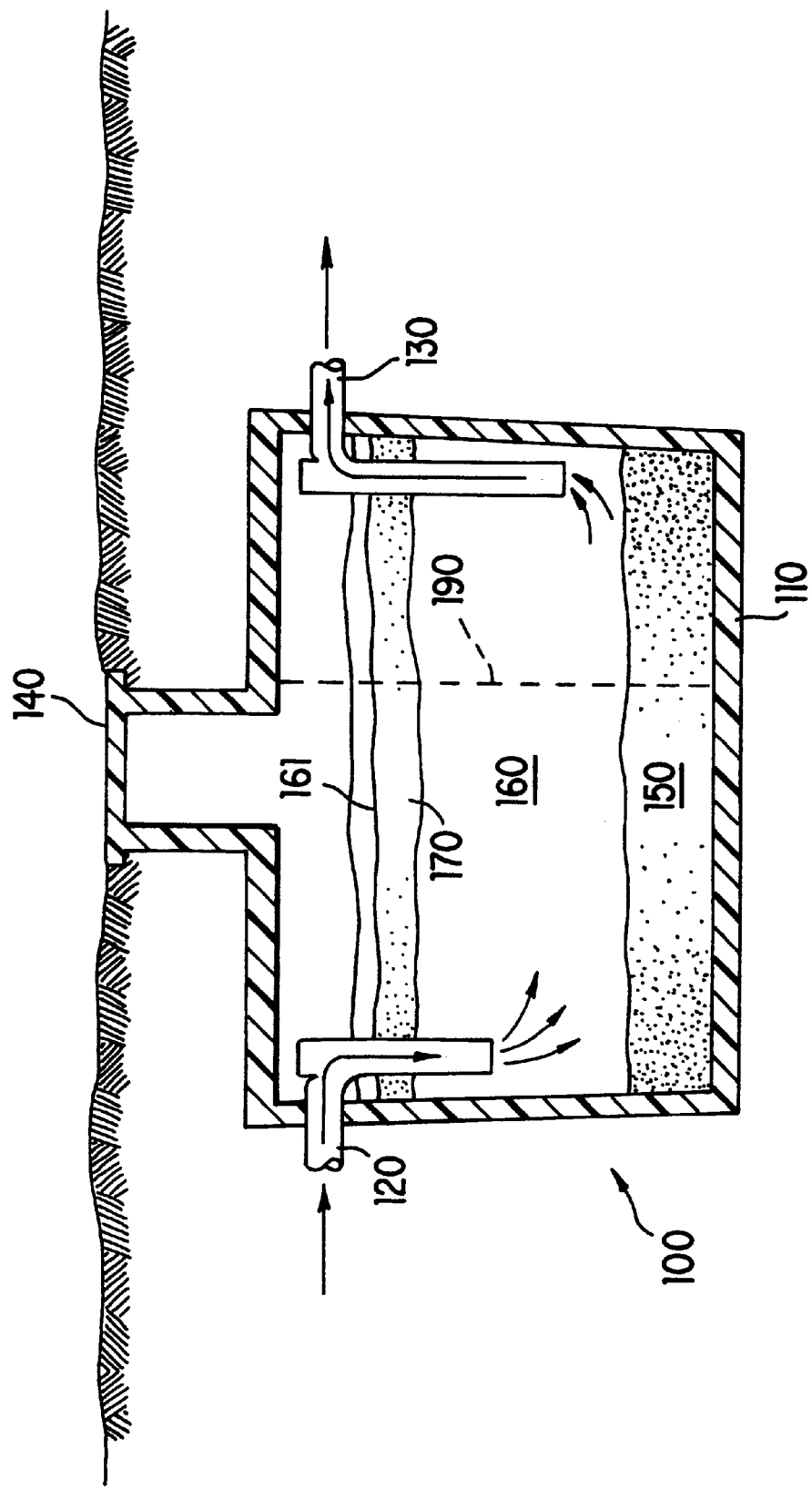
FIG. 1 is a cross sectional view of a prior art septic tank.

FIG. 5 illustrates several access points to the tank 200. An access pipe 17 is provided from the inlet "T" 16a to the surface. The access pipe 17 preferably protrudes above the surface, although many installers and homeowners choose to keep the pipe 17 beneath the surface. The pipe 17 provides access to the inlet "T" 16a in the event of a clog. A pump out pipe 25 is also provided. The pump out pipe 25 may be mated to the tank 200 with a rubber boot 26, or alternatively may be glassed in to the tank 200. The pump out pipe 25 is used for the periodic sludge removal process. A riser 19 is also provided. The riser 19 may be any size, but is commonly 18, 24 or 30 inches in diameter. The riser 19 provides access to the filter 21 as well as to a pump if one is provided. The riser 19 may also be used to remove sludge from the smaller compartment 23 should that ever become necessary. Although the riser 19 is shown as buried in FIG. 5, it may also be at ground level as shown in FIG. 1.

The tank 200 is shown in FIG. 5 with a layer of scum 30 and a layer of sludge 31 floating on a clear layer 32, with approximately three quarters of the volume of the scum layer 30 below the liquid level 33 of the clear layer 32 and approximately one quarter of the volume of the scum layer 30 below the liquid level 33. The liquid level 33 is also shown near the top of the tank 200, but the liquid level 33 as well as the top of the scum layer 30 are both preferably below the top of the lower portion 1. This keeps sewage away from the joint between the lower portion 1 and the upper portion 2. Another advantage of the present invention is provided by the raised portions 500 of the tank endwalls 202. The raised endwall portions 500 allow the inlet 16 and/or outlet 18 to pass through the endwalls 202 at a height near the top of the endwalls 202 without intersecting any seam between the lower portion 1 and upper portion 2.

Figure 6:
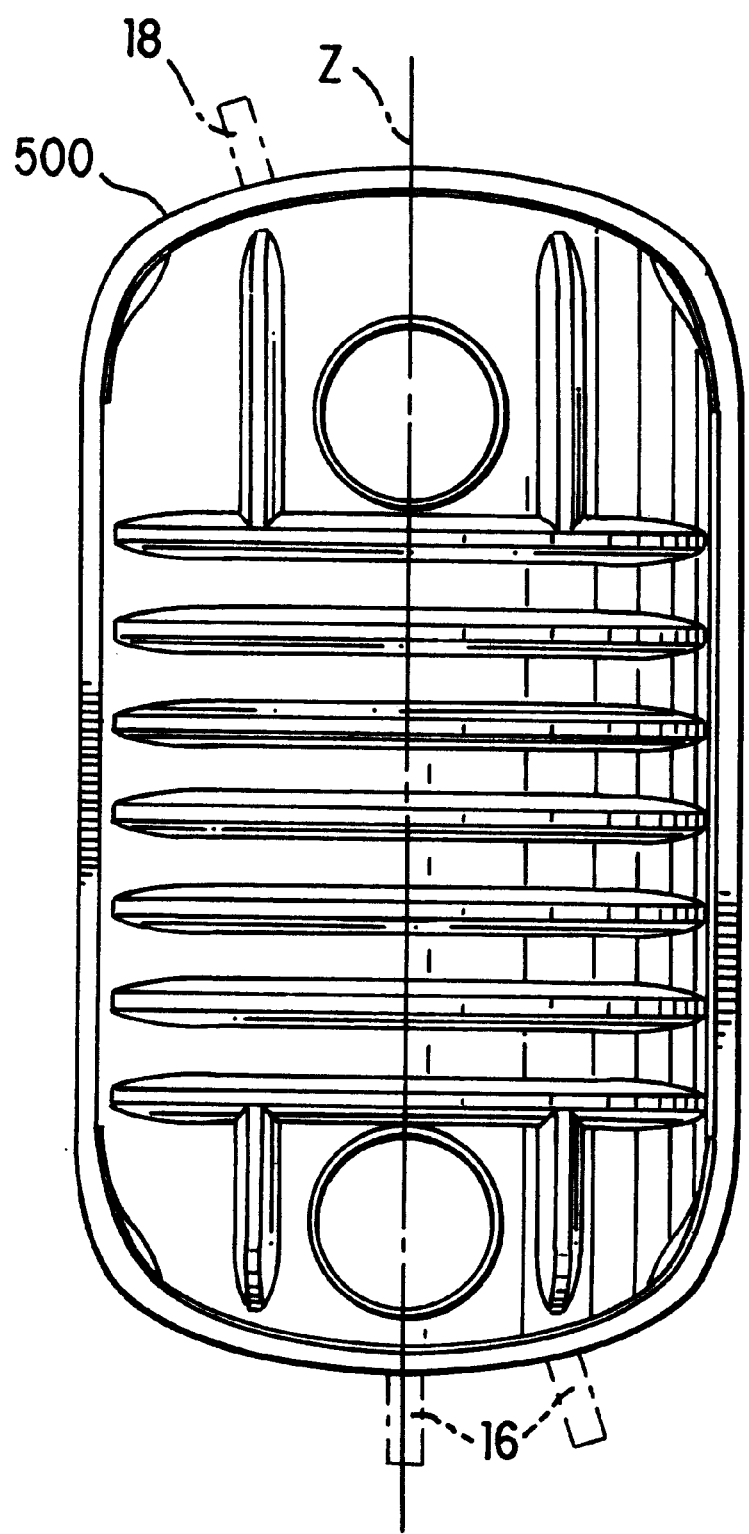
FIG. 6 is a top view of the septic tank of FIG. 2.

Referring now to FIG. 6, a top view of the tank 200, it can be seen that the end walls 500 are curved. This curvature allows both the inlet 16 and the outlet 18 (shown in phantom in FIG. 6) to be connected to the tank 200 at different, non-zero angles with respect to the main axis Z while intersecting the end wall 500 nearly perpendicularly, thereby simplifying the pipe/wall joint.

Figure 7:
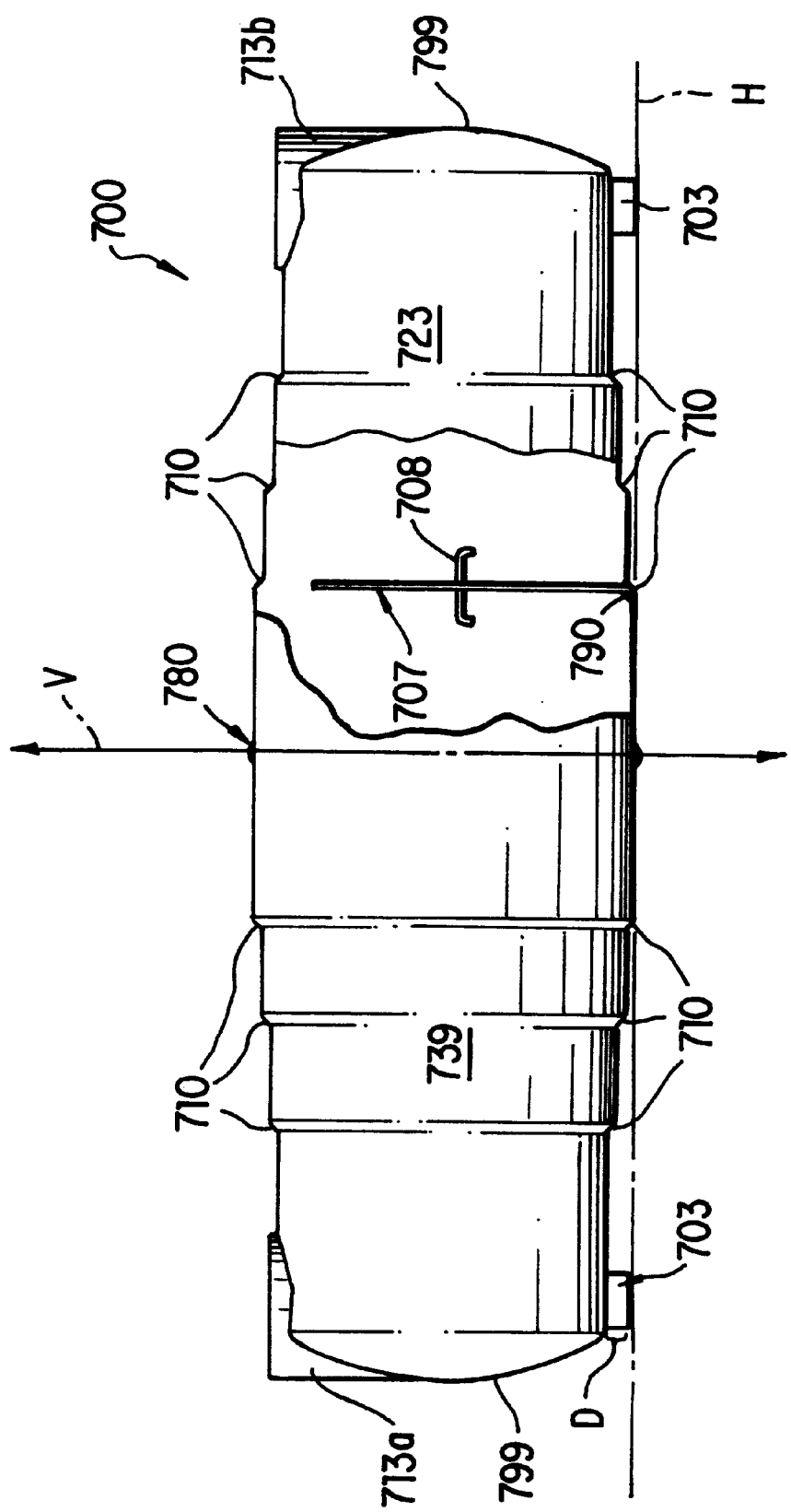
FIG. 7 is a side view of a septic tank according to a second preferred embodiment of the invention.

A second embodiment of a tank 700 is illustrated in FIG. 7. The tank 700 is generally cylindrical, but each half (relative to the center vertical axis V) of tank 700 includes a number of stepped ribs 710. What is meant by "stepped ribs" is that the stepped ribs 710 are vertical surfaces that connect sections of the tank 700 having different circumferences. The stepped ribs 710 provide structural support to the tank much in the same way as internal or external ribs would provide support. However, unlike external or internal ribs, the stepped ribs can be molded into the tank 700 directly using an appropriately-shaped male mold. In other words, the tank 700 can be constructed by placing a male mold corresponding to one half of a tank on a mandrel, applying the resin and fiberglass mat or chop over the mold, allowing the resin to cure, removing the cured tank half from the mold and joining it at seam 780 with another half tank prepared in the same manner and possibly using the same mold.

A baffle 707 is also included in the tank 700. The baffle 707 is installed in a tank half before the halves are joined to form the tank 700. The baffle 707 is located at a step rib 710, which provides support for the baffle 707. An adhesive or reinforced resin 790 preferably forms a watertight seal between the baffle 707 and the step rib 710.

As discussed above, the location of the baffle 707 preferably divides the tank 700 into two unequal portions 723, 739 in a 2:1 ratio. The baffle 707 also includes a "U" pipe 708 with the ends of the "U" turned downward to provide for fluid communication between the tank halves and to prevent the pipe 708 from becoming clogged by buoyant-neutral debris. The baffle 707 may extend a portion of the diameter of the tank 700 (as shown in FIG. 7) or may extend across the entire diameter.

Leveling blocks 703 are provided at each reduced-diameter end 799 of the tank 700 to provide support when the tank 700 is at rest on a horizontal surface H. The leveling blocks 703 extend downward a distance D from the tank ends 799 to the horizontal surface H.

Figure 8:
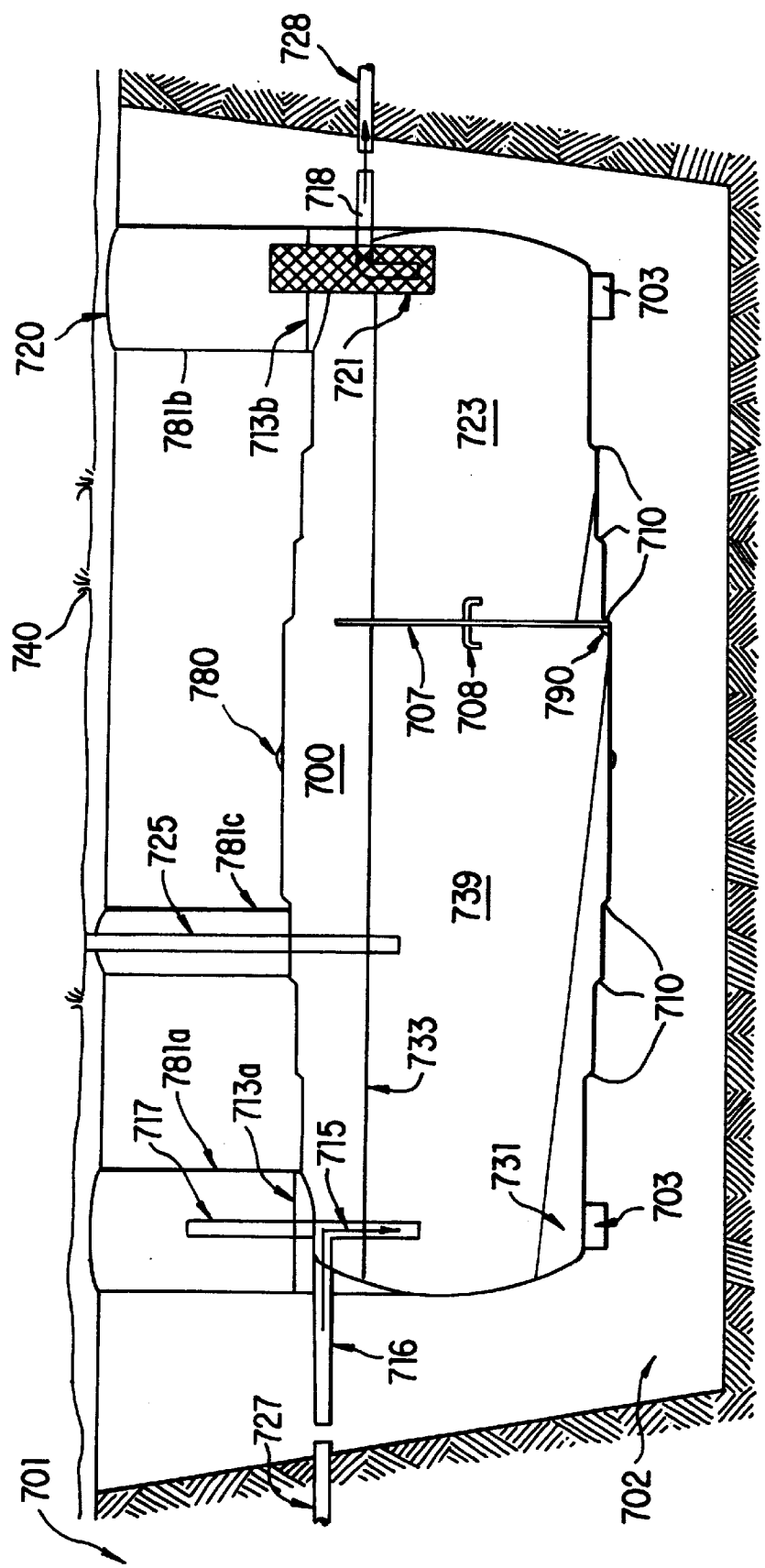
FIG. 8 is a side view of the tank of FIG. 7.

Access risers 713 are also provided at each end 799 of the tank 700. As can be seen with reference to FIG. 8, which illustrates a tank 700 installed in a pit 702 in the ground 701, access riser 713a provides access to the inlet "T" 715 and access pipe 717 on one tank end 799 and access riser 713b provides access to the outlet filter 721 on the other tank end 799. Risers 781 provide access to the access risers 713a,b from just below ground 740 level. Another access pipe 725 and riser 713c are provided for periodic removal of accumulated sludge 731.

Figure 9:
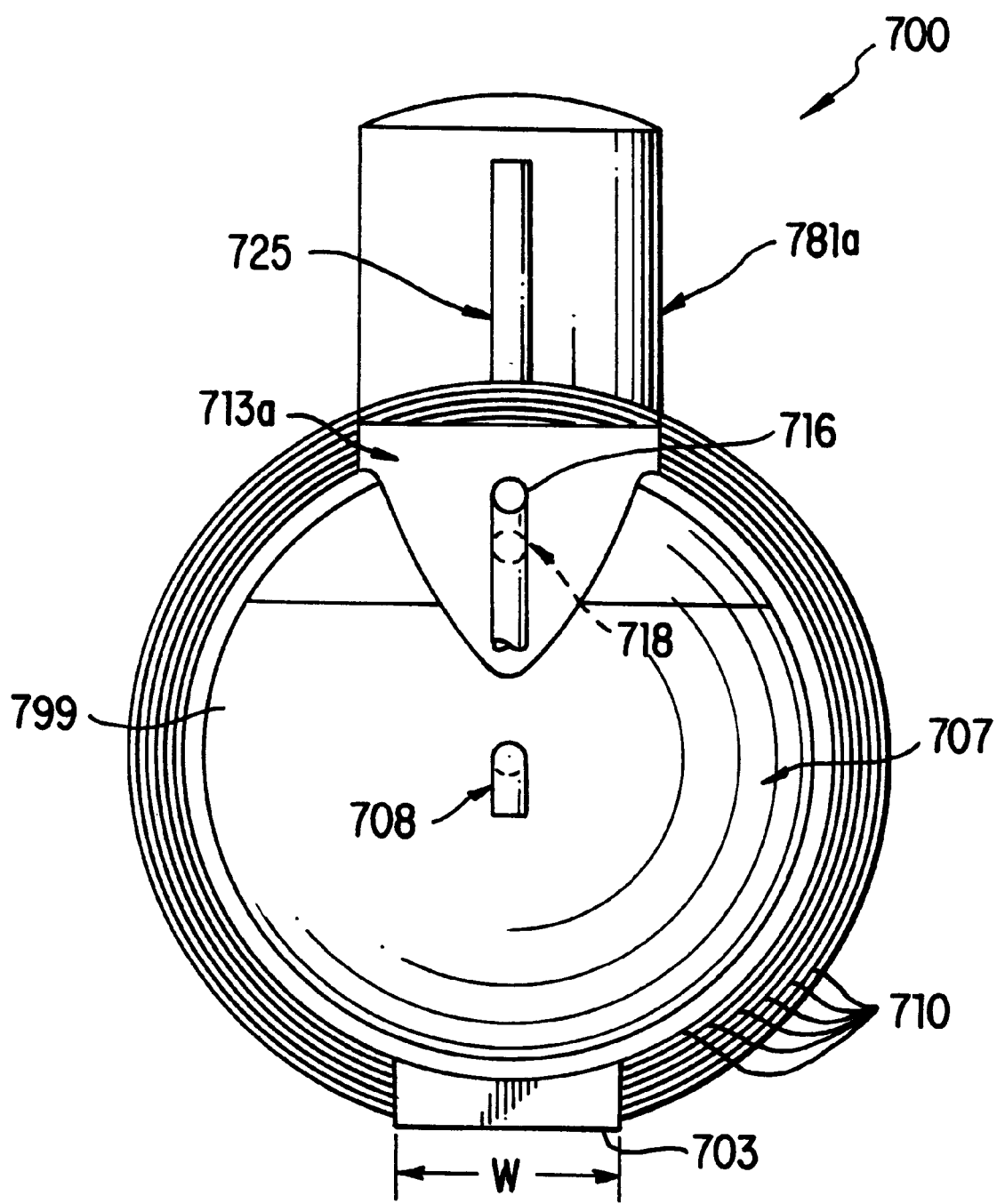
FIG. 9 is an end view of the tank of FIG. 7.

An end view of the tank 700 is shown in FIG. 9. The width W of the leveling block 703 is preferably 1–2 feet, the only requirement being that the width W be sufficient to stabilize and support the tank end 799. FIG. 9 also illustrates that the inlet 716 is located above the outlet 718, as was the case for the tank 200 discussed above.

Figure 10:
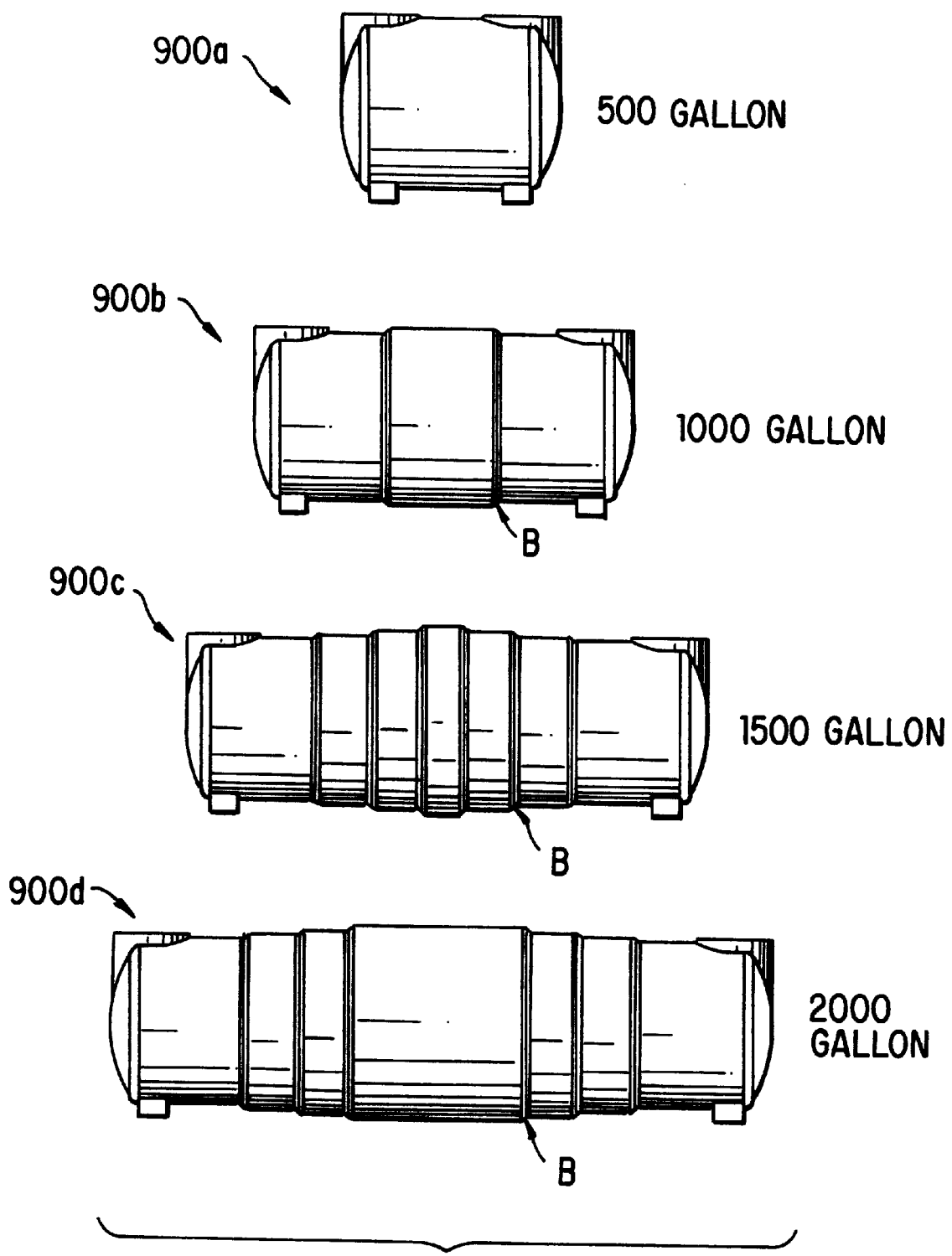
FIG. 10 is a side view of differently-sized tanks according to the preferred embodiments of the present invention.

FIG. 10 illustrates several different sizes of tanks 900a–d, each with different numbers of stepped ribs. One 500 gallon tank 900a has no stepped ribs. The preferred baffle location B is indicated for each tank 900a–d.

Although the embodiment of the tank 900 discussed above has a single, vertical seam, those of skill in the art will recognize that it is also possible to build a tank having a horizontal seam.

Both of the septic tanks described above are water-tight, thereby preventing groundwater from prematurely forcing unclarified waste out of the septic tank. Because the fluids that exit the tanks according to the present invention are clarified, the outlet pipes may be of smaller diameter, such as 1–3" plastic pipes, than previously possible. The flexibility of such plastic pipes allows installation of the pipes just below the frostline and following the terrain. The cost benefits associated with such an installation are substantial as compared to a traditional six inch or larger concrete pipe installation.

Another advantage of the water-tight tanks according to the present invention is that they may be used with alternative treatment plans that are becoming increasingly common in light of municipal regulations and/or the refusal of many municipal sewage treatment plants to accept new customers. One example of an alternative treatment plan for which tanks according to the present invention are especially useful is a system in which 750–3000 gallon septic tanks according to the present invention are connected to receive waste from 1–3 dwelling units for first phase treatment. Clarified waste leaves these smaller tanks through small diameter pipes and feeds into sand filters or a larger tank sized to accept clarified waste from several 750–3000 gallon septic tanks, which in turn feeds into sand filters. The entire waste treatment process occurs in these systems without any connection to a municipal waste treatment facility.

Obviously, numerous modifications and variations of the present invention are possible in light of the above teachings. It is therefore to be understood that within the scope of the appended claims, the invention may be practiced otherwise than as specifically described herein.

What is claimed is:

1. A septic tank comprising:
   a plurality of portions;
   wherein the portions are formed of fiberglass and are sized such that all seams between all of the portions are located entirely above a sewage line corresponding to an expected maximum volume of sewage in the septic tank.

2. The septic tank of claim 1, wherein the tank includes a lower portion that has a substantially flat bottom section.

3. The septic tank of claim 1, wherein the tank includes an upper portion and a lower portion that includes at least one raised endwall that allows a pipe to pass through the raised endwall above the sewage line but below a seam between the upper portion and the lower portion.

4. The septic tank of claim 1, wherein the tank includes an upper portion and a lower portion, and the upper and lower portions include integrally molded ribs.

5. The septic tank of claim 4, wherein the ribs have a cross sectional shape in the form of a trapezoid.

6. The septic tank of claim 1, wherein the tank includes a lower portion shaped such that it may be stacked with lower portions from other tanks.

7. The septic tank of claim 1, wherein the tank includes an upper portion shaped such that it may be stacked with upper portions from other tanks.

8. The septic tank of claim 1, wherein the tank includes a lower portion and at least one endwall of the lower portion is curved such that a pipe may intersect the at least one endwall substantially perpendicularly while forming a non-zero angle with respect to a main axis of the septic tank.

9. The septic tank of claim 1, wherein the tank includes an upper portion and a lower portion and the upper and lower portions are shaped such that they are separately nestable.

10. A septic tank comprising:
    a first half; and
    a second half attached to the first half;
    wherein the first half and the second half include at least one stepped rib and are formed of fiberglass, and wherein the first half has a first end, the second half has a second end, and the septic tank further comprises a first leveling block attached to the first end and a second leveling block attached to the second end.

11. A method for making a septic tank comprising the steps of:
    forming an integrally molded lower portion from fiberglass such that the lower portion can hold a liquid volume larger than an expected maximum volume of sewage; and
    forming an upper portion from fiberglass, the upper portion being sized to cover the lower portion.

12. The method of claim 11, wherein the lower portion includes at least one integral rib.

13. The method of claim 12, wherein the ribs are internal.

14. The method of claim 13, further comprising the step of forming the lower portion with at least one raised portion, and forming a hole for an inlet pipe in the raised portion at a location above a top of the liquid volume.

15. A septic tank comprising:
    a lower portion; and
    an upper portion;
    wherein the lower portion is larger than the upper portion and the upper portion and the lower portion are formed of fiberglass and are sized such that the entirety of a seam between the upper portion and lower portion is located above a sewage line corresponding to an expected maximum volume of sewage in the septic tank, and at least one endwall of the lower portion is curved such that a pipe may intersect the at least one endwall substantially perpendicularly while forming a non-zero angle with respect to a main axis of the septic tank.

16. A method for making a septic tank comprising the steps of:
    forming a lower portion from fiberglass such that the lower portion has a liquid volume larger than an expected maximum volume of sewage, the lower portion being formed such that it includes at least one internal, integral rib, the lower portion further including at least one raised portion;
    forming a hole for an inlet pipe in the raised portion above a top of the liquid volume; and
    forming an upper portion from fiberglass, the upper portion being sized to cover the lower portion.

* * * * *